53-459 [illegible]
ATP43 [illegible] 28,350

March 4, 1975 B. LERNER Re. 28,350

BAG HANDLING APPARATUS AND METHOD

Original Filed April 29, 1968 2 Sheets-Sheet 1

INVENTOR.
BERNARD LERNER
BY
Watts, Hoffmann, Fisher & Heinke
ATTORNEYS.

BAG HANDLING APPARATUS AND METHOD
Original Filed April 29, 1968 2 Sheets-Sheet 2
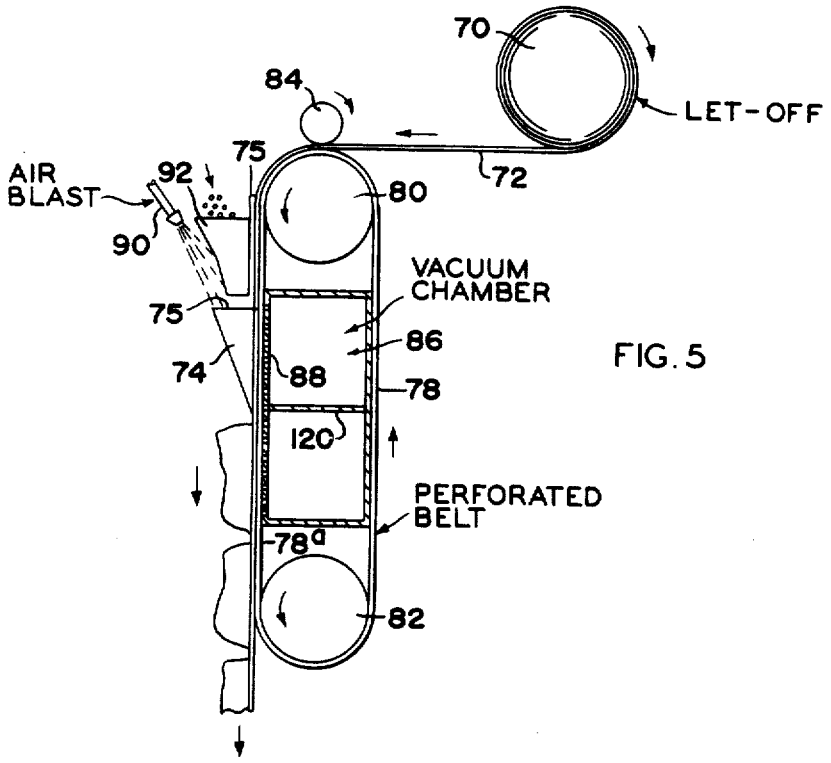
FIG. 5
FIG. 6
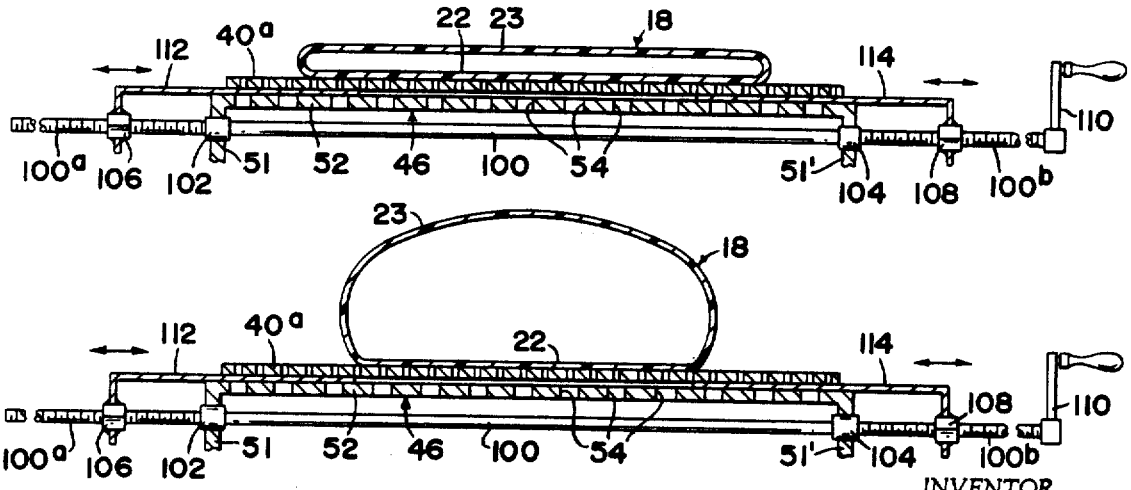
FIG. 7
INVENTOR.
BERNARD LERNER
BY
Watts, Hoffmann, Fisher & Heinke
ATTORNEYS.

United States Patent

Re. 28,350

Reissued Mar. 4, 1975

28,350

BAG HANDLING APPARATUS AND METHOD

Bernard Lerner, Hudson, Ohio, assignor to Automated Packaging Systems, Inc., Bedford Heights, Ohio Original No. 3,579,948, dated May 25, 1971, Ser. No. 731,672, Apr. 29, 1968. Application for reissue May 23, 1973, Ser. No. 363,122

Int. Cl. B65b *43/04, 43/30*

U.S. Cl. 53—29 17 Claims

Matter enclosed in heavy brackets [ ] appears in the original patent but forms no part of this reissue specification; matter printed in italics indicates the additions made by reissue.

ABSTRACT OF THE DISCLOSURE

A chain of bags in part carried by a gas-permeable movable belt is held in place against the belt by a vacuum while the belt is advanced and a flow of gas expands a bag for loading. Marginal edges of the bag chain may be isolated from the vacuum to facilitate bag expansion.

BACKGROUND OF THE INVENTION

This invention relates to packaging and more particularly to methods and apparatus for advancing and opening bags of a chain for loading.

Continuous strips or chains of open bags with the openings oriented in the same direction have been disclosed in U.S. Letters Pat. Nos. 3,254,468 and 3,254,825, both issued June 7, 1966, to Hershey Lerner and entitled, respectively, "Method of Packaging Articles" and "Flexible Container Strips." Such container strips or chains of bags are typically fabricated of tubular polyethylene or other plastic. Plies of the tube are transversely sealed together at spaced intervals along the length of the strip so as to define containers. In the preferred construction, one ply of each bag is perforated to facilitate separation of the bags while the second ply of each bag is severed across the strip so that a chain of open bags is provided.

Apparatus for utilizing a chain or strip of bags as described above is disclosed in the aforementioned patents and in U.S. Letters Pat. No. 3,298,156 issued Jan. 17, 1967, to Hershey Lerner, entitled "Method and Apparatus for Packaging." While the container delivery devices and bag strips of the referenced patents greatly expedite bagging of products because of the relative facility with which bags in a chain can be handled as compared with individual bags, they require: (1) each bag be open; and (2) the bags be advanced closed end first, to facilitate the opening, loading and advancement of the bags. While the bags and delivery devices of the referenced patents have enjoyed great commercial success, there are applications where it is advantageous to advance the bags open end first, as where a chain is formed of bags that are initially closed but which are opened when a preceding bag is separated from the chain.

SUMMARY OF THE INVENTION

In accordance with the present invention, the advantage of handling bags in a chain is maintained. In addition, the present invention provides the flexibility of permitting the bags to be advanced either closed or open end first. Thus, one may either use the chain of bags of the referenced patents or a chain of closed bags. The apparatus of this invention feeds the strip of bags to a loading station and holds the bags in position for loading. This apparatus preferably also controls the extent of bag expansion.

The preferred arrangement has a porous belt which serves as a gas-permeable bag carrier. The belt moves portions of a continuous strip or chain of flat bags across a vacuum manifold so that atmospheric pressure holds the flat overlying bag strip against the carrier. While the flattened strip is so held, it is advanced by the belt across a loading station and a stream of air or other gas is directed at an opening of one of the bags of the strip or chain. This bag is inflated by the airstream so that an article can easily be introduced into the bag. At the same time, the bag being filled is held in place against the carrier by the pressure differential. While firmly held against the carrier, the open bag is loaded either automatically or manually.

With this arrangement, a bag already loaded need not be used to advance the next succeeding bag, and neither a preceding nor a succeeding bag is relied upon to hold the bag being loaded in a given location or orientation. Thus, a loaded bag can be removed from a chain of bags and the succeeding bag can be moved, open end forward, into a flow of gas that inflates the bag for loading.

In order to facilitate the opening of a flattened bag held against the carrier by a pressure differential, adjustable baffles have been provided to isolate marginal edges of the bag strip from the effects of the pressure differential. This permits an upper or outer one of the two plies forming the bag, plus longitudinal marginal portions of the ply that is directly against the carrier, to expand away from the supporting surface of the carrier. As a result, the contour of the bag opening varies from the otherwise normal shallow and wide shape that results when one entire ply is held flat.

Accordingly, it is an object of this invention to provide novel and improved methods and apparatus for feeding and opening connected bags forming a strip or chain of containers.

BRIEF DESCRIPTION OF THE DRAWING

FIG. 5 is a diagrammatical side elevational view, with parts in section, of apparatus similar to that shown in FIG. 1, but oriented vertically and utilizing a strip of bags in which the bag openings are directed in the opposite direction from the openings shown in the strip of FIG. 1;

FIG. 6 is a partial transverse sectional view of a vacuum chamber constructed in accordance with the present invention, illustrating a pair of adjustable baffles for controlling the effective area of the vacuum chamber and showing a bag of a chain of bags in unopened condition; and FIG. 7 is a partial transverse sectional view similar to FIG. 6, showing a bag of a chain of bags in opened condition, illustrating the manner in which the adjustable baffles have controlled the shape of the bag opening.

DESCRIPTION OF THE PREFERRED EMBODIMENTS

Figure 1:
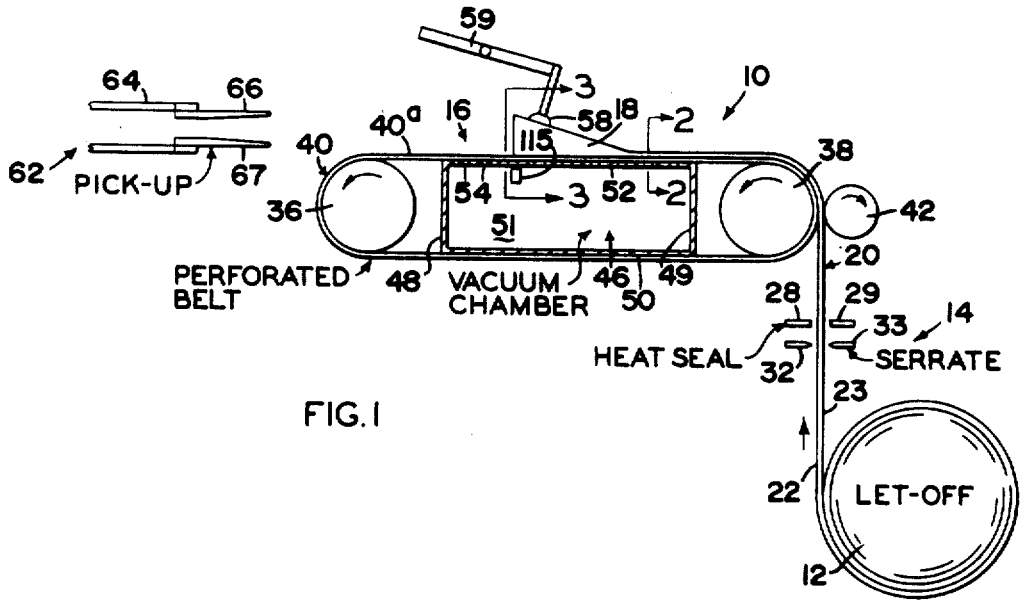
FIG. 1 is a diagrammatical side elevation view, with parts in section, illustrating apparatus embodying the present invention.

FIG. 1 diagrammatically depicts a packaging apparatus 10 constructed in accordance with the present invention. The apparatus 10 includes a letoff 12 for a strip of bag-forming material or for a chain of formed bags, a bag-forming station 14, and a loading station 16.

Figure 2:
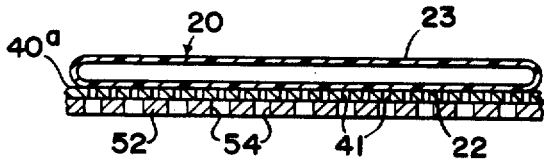
FIG. 2 is a partial transverse sectional view of the apparatus shown in FIG. 1, taken along the lines 2—2 and looking in the direction of the arrows.
Figure 4:
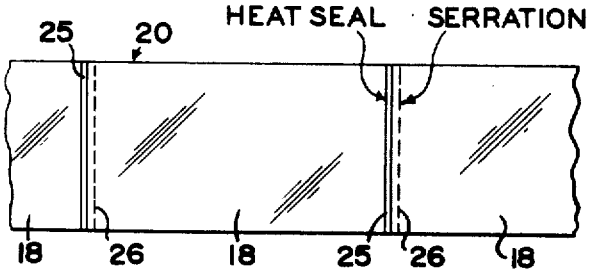
FIG. 4 is a top plan view of a strip or chain of bags of a type used with this invention.

In the embodiment of FIG. 1, bags 18 to be filled are formed one at a time from a flat strip 20 of tubular thermoplastic material, such as polyethylene, which is advanced from a roll carried by the letoff 12. The tubular strip 20 is flat, as shown in FIGS. 2 and 4 of the drawings, and is considered to be formed of two overlying plies 22, 23. As the strip 20 is moved through the bag-forming station 14, the two plies are heat sealed together and serrated along parallel lines extending across the strip at spaced longitudinal locations. As shown in FIG. 4, the strip 20 is sealed together at spaced locations 25 and is cut with a serrated blade to produce a line 26 of spaced cuts immediately adjacent and behind the sealed line in the direction of strip movement. Individual bags 18 are thereby formed between successive cut lines 26 and provided with a closed end by the heat-sealed portion 25. The open ends formed by the line of cuts 26 are held closed and the successive bags are held together by portions of the plies that are not severed.

The manner in which the tubular strip 20 is heat sealed and cut is conventional and is diagrammatically illustrated in FIG. 1 by two heat-sealing jaws 28, 29 that extend transversely across the strip on opposite sides, are resistively heated, and are movable between the open positions shown and closed or clamping positions where they contact opposite sides of the strip 20. The lines of cuts 26 are formed by two serrated cutter blades 32, 33 which are on opposite sides of the strip 20 and directly beneath the heat-sealing jaws 28, 29. The cutter blades 32, 33 extend transversely across the strip and make a line of small spaced cuts across the strip when brought together from the spaced positions shown. The cut lines 26 facilitate the later removal of individual bags, yet assure sufficient strength so that the strip remains integral as it is advanced. In the construction of the chain or strip 20, both plies 22, 23 remain connected so that each bag 18 is unopened until the preceeding bag is removed from the strip and the ends to be opened face in the direction of bag movement. It will be apparent that while the bags 18 have been formed from a continuous tubular strip 20 in the embodiment shown, a roll of preformed bags can be substituted and the bag-forming station 14 eliminated.

The loading station 16 is provided with an idler roll 36 and a driven roll 38 with parallel axes aligned horizontally and extending transversely of the width of the strip 20. An endless gas-permeable belt 40 having pores or perforations 41 (FIG. 2) is trained around the roll 38. The strip or chain 20 of bags 18 is pinched between the belt 40 and the pinch roll 42 so that the strip of bags is advanced from the letoff 12 onto the belt 40 as the belt 40 is driven by the roll 38. The strip 20 follows the belt 40 over the upper side of the driven roll 38 and is carried on top of an upper reach 40a of the belt 40, extending from the driven roll 38 to the idler roll 36.

A vacuum chamber 46 is provided between the two rolls 36, 38 directly beneath the upper reach 40a of the porous belt 40. As shown, the vacuum chamber 46 is generally box-shaped, and has solid end walls 48, 49, a solid bottom wall 50, and solid sidewalls, one of which is shown at 51. A top wall 52 is perforated, having apertures 54 that directly underlie the upper reach 40a of the belt 40. The vacuum chamber 46 is connected with a suitable exhaust pump (not shown) so that a pressure lower than ambient pressure can be produced within the chamber, thereby creating a pressure differential on opposite sides of the upper reach 40a of the belt 40.

A vacuum cup 58 is located above the upper reach 40a of the belt 40 and movable toward and away from the upper reach 40a. The vacuum cup 58 is located adjacent the downstream end of the vacuum chamber 46 so that when it is moved toward and then away from the belt 40 it will spread the open end of a bag 18 that is carried on the upper reach 40a and overlies the vacuum chamber 46. The vacuum cup 58 is shown as supported by a pivotally movable arm 59. Structures for moving vacuum cups toward and away from packaging materials for manipulating them are well known in the art and therefore not shown in detail here.

A pickup mechanism 62 is provided at the loading station to introduce an article into an inflated bag 18 and to then separate the loaded bag from the strip 20 and carry it from the belt 40. The pickup 62 is of conventional construction, but operates in a novel manner. The pickup 62 includes actuating rods 64 that are automatically reciprocated longitudinally relative to the belt 40, directly above the upper reach 40a, from a position remote from the belt 40 to a position over the vacuum chamber 46 where the first bag 18 is shown in FIG. 1. Two laterally spaced spreaders 66, 67 extend forward from the rods 64. The two spreaders 66, 67 are automatically movable, in timed relationship with the reciprocation, toward and away from each other in order to spread the bag once they have entered it. A product is subsequently inserted between the spreaders.

Figure 3:
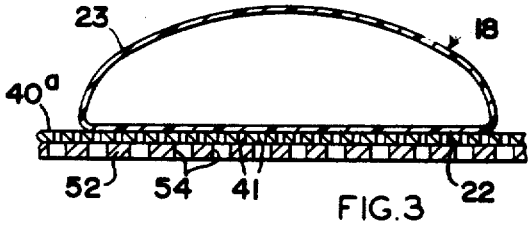
FIG. 3 is a partial transverse sectional view of the apparatus of FIG. 1, taken along the line 3—3 and looking in the direction of the arrows.

In operation, bags are formed from the tubular strip of material 20 at the forming station 14 in the manner already described or are fed from a roll of already formed bags from the letoff 12. The bags are advanced by the action of the driven belt 40 and the pinch roll 42. Normally the belt 40 is driven intermittently to facilitate loading the bags at station 16 and to facilitate forming the bags at station 14, although a strip of formed bags can be advanced continuously if an appropriate loading mechanism is provided or if hand loaded. The chain of bags extends along the upper reach 40a of the belt 40 over the vacuum chamber 46. Atmospheric pressure above the upper reach 40a is greater than the pressure in the vacuum chamber 46, and by virtue of the porosity of the belt 40, the bags 18 that overlie the vacuum chamber 46 are held tightly against the belt 40 by this pressure. This assures that the chain of bags will be properly moved from the area of the pinch roll 42 to the position, an open end of the bag occupied when the preceding bag was separated at a line of cuts 26 facing forward. The vacuum cup 58 lifts the upper ply 22 of the bag 18 at the open end of the bag. The upper ply 22 is thereby raised from the lower ply 23, which is held firmly against the belt 40 by the differential in air pressure on opposite sides of the upper reach 40a. The open condition of the inflated bag 18 is shown in FIG. 3 of the drawings. The bag is now in condition to be loaded with an article.

One preferred means of loading the spread bag 18 is with the pickup assembly 62 is in the manner described above. After the spreaders 66, 67 are inserted, the spreaders are moved back (to the left in the orientation of FIG. 1) tearing the bag 18 from the succeeding bag along a cut line 26 between the two. This force is, of course, sufficient to overcome the force of the pressure differential tending to hold the lower ply 23 of the loaded bag in contact with the belt 40. The bag is then loaded and removed from the pickup assembly. Further rotation of the belt 40 advances a succeeding bag 18 over the vacuum chamber 46 and the cycle is repeated.

Another embodiment of this invention is shown in FIG. 5 of the drawings. The apparatus shown is similar to the apparatus of FIG. 1, but is arranged vertically and is shown in use with a chain of bags constructed as disclosed in the aforementioned patents of Hershey Lerner, wherein one ply of each bag is connected to form the strip or chain and the other of the plies contains a transverse slit opening to provide access to each bag of the chain. The apparatus of FIG. 5 includes a letoff 70 that supplies a chain 72 of bags 74 to a loading station 76. For clarity of illustration, the thickness of the chain or strip 72 is exaggerated in the drawings.

At the loading station 76, a perforated or porous gas-permeable belt 78 is trained around an upper drive roll 80 and a lower idler roll 82. A pinch roll 84 above the drive roll 80 is biased toward the belt 78 to pinch the chain 72 of bags so that movement of the belt 78 advances the chain of bags from the letoff 70. A vacuum chamber 86 is located between the drive roll 80 and idler roll 82 and is provided with a perforated surface 88 over which a reach 78a of the belt 78 moves. An exhaust means (not shown) is connected with the vacuum chamber 86 to reduce the pressure therein, and create a pressure differential on opposite sides of the reach 78a of the belt 78.

An air nozzle 90 is located upstream from the vacuum chamber 86 with respect to the direction of movement of the chain of bags 72. The nozzle 90 is spaced in front of the reach 78a of the belt and is directed toward the belt so as to inflate each bag 74 through a trailing open end 75 as the bag moves over the vacuum chamber 86. A hopper or funnel 92 is located in front of the reach 78a of the belt 78, in advance of the vacuum chamber 86, and serves to direct articles into a bag 74 that has been opened by a flow of air from the nozzle 90. As will be apparent from the arrangement of parts in FIG. 5, the bags 74 are opened by the flow of air from the nozzle 90 immediately after they move past the hopper or funnel 92 and over the perforated surface 88 of the vacuum chamber 86. Movement of the belt 78 carries the connected bags 74 of the chain 72 across the loading station. Loaded bags can be separated from the chain at any point, as they are not relied upon to advance the chain through the loading station.

The apparatus of FIG. 5 is also well suited for use with a chain of bags advanced open end first such as the chain shown in FIG. 1. In this case the chain is fed from the letoff 70 under the roll 82 and upward along the reach 78a. In operation, the rolls 80, 82 are then rotated in a direction opposite that indicated by the arrows in FIG. 5.

Apparatus is shown in FIGS. 6 and 7 for adjusting the effective width of the vacuum chamber 46 or 86 of the apparatus already described. For convenience in description, the adjusting apparatus is shown in conjunction with the vacuum chamber 46 of the embodiment of FIG. 1. This apparatus permits the contour of the open end of a bag 18 to be varied from the configuration that it would normally attain, shown in FIG. 3, to a narrower and deeper or higher configuration, as shown in FIG. 7.

As shown in FIGS. 6 and 7, a rotatable shaft 100 extends transversely through opposite sidewalls 51, 51' of the vacuum chamber 46, beneath the perforated top wall 52. The rod 100 is rotatably journaled in bearings 102, 104 in the walls 51, 51', respectively. A threaded portion 100a of the rod 100 extends beyond the sidewall 51 and receives a nut 106. Similarly, a threaded portion 100b of the shaft 100 extends beyond the sidewall 51' and carries a nut 108. A crank arm 110 is connected to the shaft 100 at the outer end of the threaded portion 100b.

Two flat baffle members 112, 114 extend along the length of the perforated top wall 52 of the vacuum chamber 46. The baffle members 112, 114 are generally rectangular in plan and extend inward from opposite sides of the vacuum chamber 46, between the upper surface of the perforated top wall 52 and the lower surface of the upper reach 40a of the porous belt 40. The baffles 112, 114 are connected at their outer edges to the nuts 106, 108, respectively. With this arrangement, the baffles 112, 114 will overlie longitudinally extending marginal portions of the vacuum chamber top wall 52, limiting the effective width of the vacuum chamber. By rotation of the crank arm 110, this effective width can be varied because rotation of the shaft 100 will cause the nuts 106, 108 to move transversely of the shaft 100 and vacuum chamber 46.

As illustrated in FIGS. 6 and 7, when the baffles 112, 114 extend inwardly from the side edges of the vacuum box so as to underlie longitudinal marginal side portions of a bag 18 of the chain 20, the effect of the pressure differential created by the vacuum chamber 46 will be limited to a central longitudinal portion of the lower ply 22. As a result, when air is directed from the nozzle 58 toward the open end of the bag 18, the upper ply 23 along with longitudinal margin portions of the lower ply 22 will be lifted from the belt 40, allowing the bag 18 to expand to a narrower and higher configuration than would be permitted if the pressure differential created by the vacuum box acted upon the entire width of the lower ply 22, as in FIG. 3. By varying the laterial position of the baffles 112, 114, the shape of the opening created in the bag 18 is varied, and can be selected to suit the article being packaged.

The perforated belt construction lends itself well to automatic sensing of the position of the lead one of a chain of bags. This sensing is desirable for controlling the feed of the chain. A sensor 115 positioned to sense the leading edge of the bag 18 in the embodiment shown in FIG. 1, for example, will automatically control the feed of the chain of bags to appropriately position the lead bag at the load station irrespective of the length of the bag or any variation in the length of the bags in a given chain.

If, for example, the conveyor is composed of a series of parallel slats which are transverse to the path of conveyor travel with small openings between contiguous slats for the bag to pass through, various types of detectors can be used to determine whether or not a given opening between two adjacent slats is covered by the bag. For example, a photoelectric cell can be provided which is sensitive to the presence of the bag or the spark gap device disclosed in the copending application, Ser. No. 634,251, entitled "Method and Apparatus for Feeding Bags of a Chain," filed Apr. 27, 1967, will detect the presence of a bag.

In FIG. 5 another advantage of the invention is shown. There, a wall 120 is provided to separate the vacuum chamber into two compartments. In that situation where the device is operated in the direction opposite the direction indicated by the arrows, and a chain of bags is fed, open end of the bags first, under the roller 82 and up the reach 78a, the bag 74 will be at the load station. Once loaded, the vacuum in that portion of the chamber 86 above the wall 120 may be released, allowing the loaded bag to fall away from the conveyor and be simply separated from the chain either by a manual operation or by a suitable automatic tear-off structure. The establishment of a vacuum in this upper chamber on a subsequent bag feed is a simple matter because the vacuum required in this device is quite low.

While preferred embodiments of the present invention have been described with particularity, it will be understood that various modifications or alterations may be made therein without departing from the spirit and scope of the invention as set forth in the appended claims.

What I claim is:

1. In a bag-handling apparatus: a vacuum means across which bags are moved and which creates a pressure differential on a bag, bag-moving means movable across the vacuum means, said bag-moving means being gas-permeable and interposed between the vacuum means and a bag to be loaded whereby the pressure differential holds a bag against the bag-moving means; means to move the bag-moving means across the vacuum means; opening means to open a bag that is moved by the bag-moving means and to hold the bag open for loading, and means to limit the effective area of the vacuum means to a width less than the width of a bag to be loaded whereby opposite edge portions of a bag can be isolated from the vacuum means so that the bag can be greatly expanded to an open condition.

2. Apparatus as set forth in claim 1 wherein the vacuum means includes a chamber that has a porous or perforated gas-permeable surface and the bag-moving means includes a gas-permeable underlay for the bag that is movable across the gas-permeable surface of the said chamber.

3. Apparatus as set forth in claim 1 including means reciprocal relative to the moving means to engage a bag and separate the bag from the bag-moving means.

4. In an apparatus for the loading of bags such as plastic bags that are connected in a flexible chain, a vacuum chamber, a continuous gas-permeable belt trained about spaced rolls with a reach extending across the vacuum chamber, drive means to move the belt across the chamber, means to feed a chain of bags onto the belt, opening means cooperable with a bag of the chain to open the bag while the vacuum chamber holds a portion of the chain against the belt and movable baffle means extending along the vacuum chamber and belt and adjustable transversely of the opening of a bag on the belt for limiting the effective width of the vacuum chamber along the said belt.

5. The apparatus of claim 4 wherein a bag is opened by the opening means while that bag is held against said belt.

6. Apparatus as set forth in claim 5 wherein said movable baffle means extends along the vacuum chamber and belt parallel to the direction of belt movement.

7. In an apparatus for the loading of bags such as plastic bags that are connected in a flexible chain, a vacuum chamber, a continuous gas-permeable belt trained about spaced rolls with a reach extending across the vacuum chamber, drive means to move the belt across the chamber, means to feed a chain of bags onto the belt, opening means cooperable with a bag of the chain to open the bag while the vacuum chamber holds a portion of the chain against the belt and means reciprocal relative to the belt to engage and separate the bag from the chain and the belt.

8. In an apparatus for the loading of bags such as plastic bags that are connected in a flexible chain, a vacuum chamber, a continuous gas-permeable belt trained about spaced rolls with a reach extending across the vacuum chamber, drive means to move the belt across the chamber, means to feed a chain of bags onto the belt, and opening means cooperable with a bag of the chain to open the bag while the vacuum chamber holds a portion of the chain against the belt, said opening means comprising a nozzle positioned to direct the flow of gas against the bag to be opened.

9. In an apparatus for the loading of bags such as plastic bags that are connected in a flexible chain, a vacuum chamber, a continuous gas-permeable belt trained about spaced rolls with a reach extending across the vacuum chamber, drive means to move the belt across the chamber, means to feed a chain of bags onto the belt, and opening means cooperable with a bag of the chain to open the bag while the vacuum chamber holds a portion of the chain against the belt, said opening means comprising a vacuum cup and articulated means to move the cup toward and away from the belt.

10. In an apparatus for the loading of bags such as plastic bags that are connected in a flexible chain, a vacuum chamber having a plurality of compartments, a continuous gas-permeable belt trained about spaced rolls with a reach extending across the vacuum chamber, drive means to move the belt across the chamber, means to feed a chain of bags onto the belt, and opening means cooperable with a bag of the chain to open the bag while the vacuum chamber holds a portion of the chain against the belt.

11. In a method of opening one of a series of bags at least the end one of which has an opening and which bags are connected together in a chain, the steps comprising: moving a flat chain of connected bags while supporting one side of the chain, applying a pressure differential to the chain to hold said one bag of the chain and the succeeding bag in the supported position, limiting the area along the chain at which the pressure differential acts to an area central of at least said one bag so that marginal edges of the chain are not held in the supported position, expanding an opening of one bag so that it can be conveniently loaded, separating said one bag from the succeeding bag in the chain while maintaining said succeeding bag in the supported position and changing the width of the said area along the chain to change the area of the chain that is held in the supported position thereby changing the area and shape of the opening of said one bag.

12. A packaging apparatus comprising:

a. a letoff for carrying a coil of two-layer plastic material;

b. transport means for receiving a strip of such plastic material from the letoff and for transmitting the strip to a loading station, said transport means and letoff establishing a path of strip travel from the letoff to the transport means;

c. a sealer along said path for sealing the layers of such plastic material together to establish one marginal edge of a bag;

d. weakening means near said sealer and along said path to establish lines of weakness in said strip with each such line delineating the ends of contiguous bags being formed, whereby formed bags may be facilely separated from the strip; and e. separating means cooperative with said transport means for separating the bags one at a time from the strip as they are transported to said loading station by said transport means.

13. A method of opening a bag including:

a. advancing a chain of bags toward a loading station along a path of travel;

b. engaging and supporting a leading bag of the chain and at least a portion of a succeeding bag while advancing said chain;

c. opening an end of said leading bag with the open end facing in the direction of travel of said chain;

d. engaging said open end of said leading bag; and, e. detaching said leading bag from said succeeding bag while maintaining said succeeding bag engaged and supported on said path of travel.

*14. Apparatus for conveying a web of material along a path of travel extending to a loading station, the web comprising first and second separable plies defining opposite faces, laterally spaced apart side edges and transverse laterally extending opening locations spaced apart along the web and between which web loading spaces are disposed, said first ply separable from said second ply at least along said opening locations to enable access to said web loading spaces at said loading station, the apparatus comprising:*

*(a) conveyor means for engaging the second ply of the web and moving the web along at least a portion of the path of travel with the web side edges extending generally parallel to the path of travel;*

*(b) opening means for acting on the web adjacent an opening location between the web side edges and separating the first ply from the second ply to open successive loading spaces when such loading spaces are individually supported by the conveyor means at a predetermined position on the path of travel; and*

*(c) said conveyor means comprising means for creating force for adhering a portion of the area of the second ply of the web to said conveyor means at least at said predetermined position on the path of travel to maintain the web positioned on the conveyor means while enabling said opening means to separate said first and second plies;*

*(d) said means for creating an adhering force comprising:*

*(i) first and second members each having a part disposed between said web side edges, at least a portion of said second ply adhered to said conveyor means at said location and between said parts, portions of said second ply extending between said side edges and a respective part freely movable away from said conveyor means to enable substantial movement of said first ply relative to said second ply by said opening means; and*

*(ii) at least one of said first and second members being adjustably movable toward and away from the other of said first and second members to change the distance between said parts of said first and second members.*

*15. Apparatus as claimed in claim 14 wherein said conveyor means comprises conveyor belt means.*

*16. In an apparatus for loading bags of a web formed by first and second confronting web plies joined together at opposite marginal sides comprising:*

*(a) a conveyor assembly including feed means to engage the first ply of a lead portion of a web in the form of a bag servable from the web of material along a line of separation;*

*(b) said feed means being adapted to hold the engaged ply of said lead portion in contact with it and to move such portion along a path;*

*(c) said assembly also including adjustment means to adjust the feed means engagement transversely of said path to selectively accommodate webs of differerent widths for movement along said path; and*

*(d) opening means for acting on the web adjacent an opening location between the marginal sides and separating the second ply from the first ply to open successive bags when such bags are individually supported by the feed means at a predetermined position on said path.*

*17. Apparatus for conveying a web of material along a path of travel extending to a loading station, the web comprising first and second separable plies defining opposite faces, laterally spaced apart side edges and transverse laterally extending opening locations spaced apart along the web and between which web loading spaces are disposed, said first ply separable from said second ply at least along opening locations to enable access to said web loading spaces at said loading station, the apparatus comprising:*

*(a) conveyor means comprising at least a conveyor belt member for engaging the second ply of the web and moving the web along at least a portion of the path of travel with the web side edges extending generally parallel to the path of travel;*

*(b) opening means for acting on the web adjacent an opening location between the web side edges and separating the first ply from the second ply to open successive loading spaces when such loading spaces are individually supported by the conveyor belt member at a predetermined position on the path of travel; and*

*(c) said conveyor means comprising means providing force for adhering a portion of the area of the second ply of the web to said conveyor means at least at said predetermined position on the path of travel to maintain the web poistioned on the conveyor means while enabling said opening means to separate said first and second plies;*

*(d) said means for providing an adhering force comprising at least a belt member surface portion disposed between said web side edges to which at least one portion of said second ply is adhered, other portions of said second ply extending laterally to said side edges and freely movable away from said conveyor means to enable substantial movement of said first ply away from said second ply by said opening means.*

References Cited

The following references cited by the Examiner, are of record in the patented file of this patent or the original patent.

UNITED STATES PATENTS

| | | | |
|---|---|---|---|
| 2,612,738 | 10/1952 | Salfisberg | 53—29 |
| 3,228,171 | 1/1966 | Cory | 53—187 |
| 3,355,166 | 11/1967 | Plumb | 53—389 X |
| 3,385,026 | 5/1968 | Schmermund | 53—389 X |
| 2,833,097 | 5/1958 | Petrea et al. | 53—386 X |
| 3,190,049 | 6/1965 | Van Der Meulen | 53—187 X |
| 3,269,087 | 8/1966 | Cloud et al. | 53—180 X |
| 3,328,939 | 7/1967 | Harris et al. | 53—385 |
| 3,344,576 | 10/1967 | Cloud et al. | 53—28 |
| 3,453,799 | 7/1969 | Cloud et al. | 53—29 |

FOREIGN PATENTS

| | | | |
|---|---|---|---|
| 222,038 | 6/1962 | Austria | 53—385 |

TRAVIS S. McGEHEE, Primary Examiner

U.S. Cl. X.R.

53—183, 187, 385, 386